US012700940B2

(12) United States Patent
Qiu et al.

(10) Patent No.: US 12,700,940 B2
(45) Date of Patent: Aug. 4, 2026

(54) METHOD, TERMINAL AND BASE STATION IN A WIRELESS COMMUNICATION SYSTEM

(71) Applicant: SAMSUNG ELECTRONICS CO., LTD., Suwon-si (KR)

(72) Inventors: Haijie Qiu, Beijing (CN); Xutao Zhou, Beijing (CN); Yuanliu Li, Beijing (CN); Yunchuan Yang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 18/553,152

(22) PCT Filed: Mar. 23, 2022

(86) PCT No.: PCT/KR2022/004026
§ 371 (c)(1),
(2) Date: Sep. 28, 2023

(87) PCT Pub. No.: WO2022/211348
PCT Pub. Date: Oct. 6, 2022

(65) Prior Publication Data
US 2024/0187120 A1      Jun. 6, 2024

(30) Foreign Application Priority Data
Mar. 31, 2021    (CN) .......................... 202110351682.0

(51) Int. Cl.
*H04W 8/22*        (2009.01)
*H04J 11/00*        (2006.01)
(Continued)

(52) U.S. Cl.
CPC ........ *H04J 11/0056* (2013.01); *H04L 5/0073* (2013.01); *H04W 8/22* (2013.01); *H04W 76/40* (2018.02)

(58) Field of Classification Search
CPC ..... H04J 11/0056; H04W 76/40; H04W 8/22; H04L 5/073
See application file for complete search history.

(56) References Cited

U.S. PATENT DOCUMENTS

2014/0233457 A1 * 8/2014 Koutsimanis ......... H04L 5/0073
370/328
2016/0044650 A1 2/2016 Enescu et al.
(Continued)

FOREIGN PATENT DOCUMENTS

WO        2022047747 A1     3/2022
WO        2022124750 A1     6/2022

OTHER PUBLICATIONS

PCT (Year: 2022).*
(Continued)

*Primary Examiner* — Shukri Taha

(57) ABSTRACT

The present disclosure provides a method, a terminal and a base station for interference cancellation/mitigation/rejection in the presence of neighboring cell interference. The method provided by the present disclosure can effectively cancel/mitigate/reject interference of neighboring cells and improve the performance of a downlink transmission receiver by receiving configuration information (e.g., system assistant information) from a base station and performing interference processing based on the received configuration information.

13 Claims, 10 Drawing Sheets

(51) Int. Cl.
H04L 5/00 (2006.01)
H04W 76/40 (2018.01)

(56) References Cited

U.S. PATENT DOCUMENTS

| | | |
|---|---|---|
| 2017/0005744 A1 | 1/2017 | Li et al. |
| 2017/0230805 A1 | 8/2017 | Yamada et al. |
| 2017/0238207 A1 | 8/2017 | Hwang et al. |
| 2022/0182844 A1* | 6/2022 | Park .................... H04W 4/06 |
| 2024/0196198 A1* | 6/2024 | Wu ..................... H04L 5/0048 |

OTHER PUBLICATIONS

International Search Report and Written Opinion of the International Searching Authority dated Jun. 23, 2022, in connection with International Application No. PCT/KR2022/004026, 9 pages.
Itri, "Discussion on CRS Interference Handling," 3GPP TSG-RAN WG2 Meeting #79, R2-123617, Aug. 2012, 4 pages.

Ericsson, "Implementing network-based CRS interference mitigation," 3GPP TSG-WG2 Meeting #102, R2-1809164, May 2018, 60 pages.
Supplementary European Search Report dated Jul. 23, 2024, in connection with European Patent Application No. 22781468.8, 11 pages.
Sharp, "Discussion on rate-matching for LTE CRS", 3GPP TSG RAN WG1 Meeting #96, R1-1902647, Athens, Greece, Feb. 25-Mar. 1, 2019, 2 pages.
Office Action issued May 6, 2026, in connection with Korean Patent Application No. 10-2023-7026800, 10 pages.
3GPP, "5G; NR; Physical layer procedures for data," 3GPP TS 38.214, version 15.8.0, Release 15, ETSI TS 138 214 v15.8.0, Jan. 2020, 109 pages.
3GPP, "5G; NR; Radio Resource Control (RRC); Protocol specification," 3GPP TS 38.331, version 15.3.0, Release 15, ETSI TS 138 331 v15.3.0, Oct. 2018, 441 pages.
3GPP, "5G; NR; User Equipment (UE) radio access capabilities," 3GPP Ts 38.306, version 16.1.0, Release 16, ETSI TS 138 306 v16.1.0, Jul. 2020, 107 pages.
Mediatek, "Dynamic Spectrum Sharing (5G) White Paper," MediaTek, Mar. 13, 2020, 30 pages.

* cited by examiner

Figure 5:
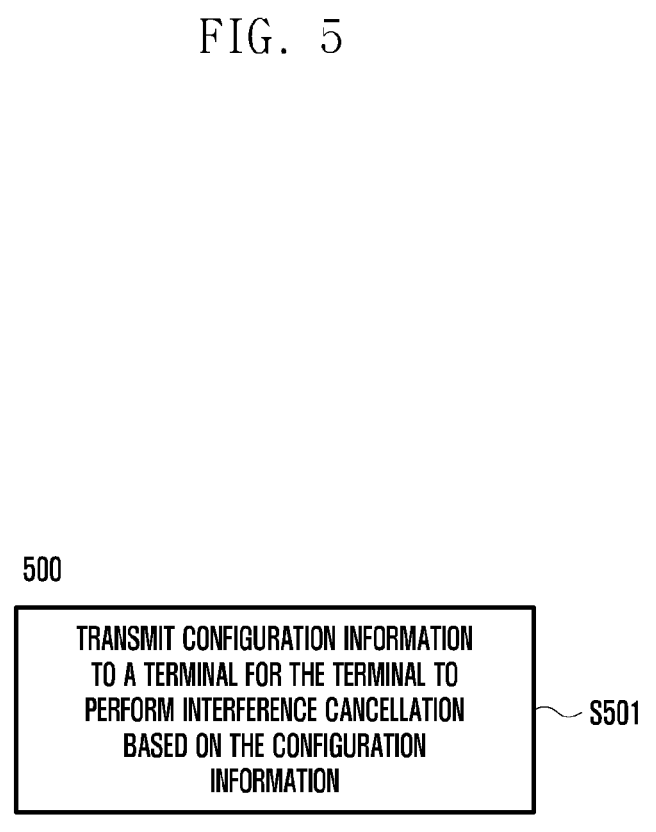

```
┌─────────────────────────────────┐
│   TRANSMIT CONFIGURATION INFORMATION │
│   TO A TERMINAL FOR THE TERMINAL TO  │
│   PERFORM INTERFERENCE CANCELLATION  │ ~ S501
│   BASED ON THE CONFIGURATION         │
│   INFORMATION                        │
└─────────────────────────────────┘
```

METHOD, TERMINAL AND BASE STATION IN A WIRELESS COMMUNICATION SYSTEM

TECHNICAL FIELD

The present disclosure relates to a technical field of wireless communication. More specifically, the present disclosure relates to a method, a terminal and a base station in a wireless communication system.

BACKGROUND ART 5G mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service arca expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

In LTE and NR wireless communication systems, in order to make effective usage of limited spectrum resources, neighboring cells may be deployed in an intra-frequency manner. This method can save frequency resources, meanwhile also may bring intra-frequency interference issue. The intra-frequency interference may come from different communication systems, such as a LTE system or a NR system.

Solution to Problem

To solve the above mentioned technical problem, embodiments of the present disclosure provide a method performed by a terminal in a wireless communication system, which includes: receiving configuration information from a base station; and performing interference cancellation based on the configuration information.

Embodiments of the present disclosure provide a method performed by a base station in a wireless communication system, which includes: transmitting configuration information to a terminal for the terminal to perform interference cancellation based on the configuration information.

Embodiments of the present disclosure provide a terminal in a wireless communication system, which includes: a transceiver configured to transmit and receive signals; and a processor configured to perform methods performed by the terminal in the wireless communication system according to the embodiments of the present disclosure.

Embodiments of the present disclosure provide a base station in a wireless communication system, which includes: a transceiver configured to transmit and receive signals; and a processor configured to perform methods performed by the base station in the wireless communication system according to the embodiments of the present disclosure.

Embodiments of the present disclosure provide a computer-readable medium having stored thereon computer-readable instructions which, when executed by a processor, implement methods performed by a terminal in a wireless communication system according to the embodiments of the present disclosure or methods performed by a base station in the wireless communication system according to the embodiments of the present disclosure.

The present disclosure provides a method, a terminal and a base station for interference cancellation/mitigation/rejection in the presence of neighboring cell interference. The method provided by the present disclosure can effectively cancel/mitigate/reject interference of neighboring cells and improve the performance of a downlink transmission receiver by receiving configuration information (e.g., system assistant information) from a base station and performing interference processing based on the received configuration information.

Advantageous Effects of Invention

The present disclosure provides a method, a terminal and a base station for interference cancellation/mitigation/rejection in the presence of neighboring cell interference. The method provided by the present disclosure can effectively cancel/mitigate/reject interference of neighboring cells and improve the performance of a downlink transmission receiver by receiving configuration information (e.g., system assistant information) from a base station and performing interference processing based on the received configuration information.

BRIEF DESCRIPTION OF DRAWINGS

The above and other aspects, features and advantages of certain embodiments of the present disclosure will become more apparent from the following description taken in conjunction with the accompanying drawings, in which:

FIG. 5 illustrates a flowchart of a method performed by a base station in a wireless communication system according to an embodiment of the present disclosure.

MODE FOR THE INVENTION

Figure 1:
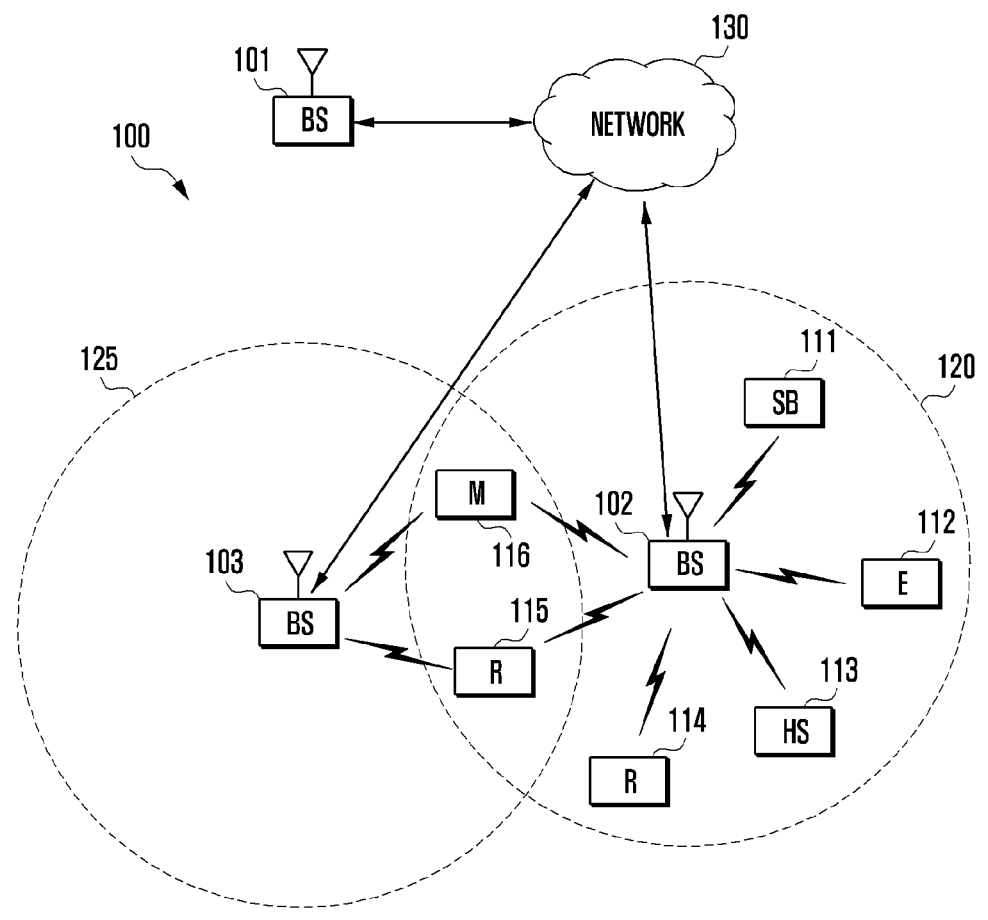
FIG. 1 illustrates an example wireless network according to various embodiments of the present disclosure.

Embodiments of the present disclosure provide a method performed by a terminal in a wireless communication system, which includes: receiving configuration information (e.g., system assistant information) from a base station; and performing interference cancellation/mitigation/rejection based on the configuration information.

According to an embodiment of the present disclosure, the method further includes: transmitting first information indicating an interference cancellation/mitigation capability of the terminal to the base station.

According to an embodiment of the present disclosure, the interference cancellation capability of the terminal includes at least one of an interference cancellation capability for cell-specific reference signal (CRS) interference and an interference cancellation capability for non-CRS interference.

According to an embodiment of the present disclosure, the interference mitigation capability for cell-specific reference signal (CRS) interference comprises at least one of the following: whether the terminal supports CRS interference cancellation; whether the terminal supports blind detection or partially blind detection; and whether the terminal supports interference cancellation in case that interference at different frequency resource locations comes from different cells.

According to an embodiment of the present disclosure, the interference cancellation capability for cell-specific reference signal (CRS) interference comprises any one of the following: the terminal supports CRS interference cancellation and supports blind detection; the terminal supports CRS interference cancellation and supports partially blind detection; the terminal supports CRS interference cancellation and does not support blind detection; and the terminal does not support CRS interference cancellation.

According to an embodiment of the present disclosure, for a terminal that supports CRS interference cancellation, the interference cancellation capability of the terminal further includes: whether the terminal supports interference cancellation in case that interference at different frequency resource locations comes from different cells.

According to an embodiment of the present disclosure, the interference cancellation capability for non-CRS interference comprises at least one of the following: the terminal supports interference cancellation based on demodulation reference signal (DMRS); the terminal supports interference cancellation based on DMRS and/or secondary reference signal; and whether the terminal needs assistant information.

According to an embodiment of the present disclosure, the interference cancellation capability for non-CRS interference comprises at least one of the following: the terminal supports interference cancellation based on demodulation reference signal (DMRS); the terminal supports interference cancellation based on DMRS and/or secondary reference signals, and needs assistant information; and the terminal supports interference cancellation based on DMRS and/or secondary reference signals, and does not need assistant information.

According to an embodiment of the present disclosure, the configuration information includes at least one of the following information: neighboring cell's CRS related information, wherein the neighboring cell's CRS related information includes information indicating a candidate neighboring cell list and cell information of a candidate neighboring cell in the candidate neighboring cell list; information for indicating neighboring cells currently used for neighboring cell CRS rate matching in the candidate neighboring cell list; and information for indicating current neighboring cells in the candidate neighboring cell list.

According to an embodiment of the present disclosure, in case that the terminal does not support CRS interference cancellation, the receiving configuration information from a base station includes receiving the following from the base station: neighboring cells' CRS related information, wherein the neighboring cell's CRS related information includes information indicating a candidate neighboring cell list and cell information of a candidate neighboring cell in the candidate neighboring cell list; and information for indicating neighboring cell(s) currently used for neighboring cell CRS rate matching in the candidate neighboring cell list.

According to an embodiment of the present disclosure, in case that the terminal supports CRS interference cancellation and supports partially blind detection, the receiving configuration information from a base station includes receiving the following from the base station: neighboring cell's CRS related information, wherein the neighboring cell's CRS related information includes information indicating a candidate neighboring cell list and cell information of candidate neighboring cells in the candidate neighboring cell list.

According to an embodiment of the present disclosure, in case that the terminal supports CRS interference cancellation and does not support blind detection, the receiving configuration information from a base station includes receiving the following from the base station: neighboring cell's CRS related information, wherein the neighboring cell's CRS related information includes information indicating a candidate neighboring cell list and cell information of candidate neighboring cells in the candidate neighboring cell list; and information for indicating current neighboring cells in the candidate neighboring cell list.

According to an embodiment of the present disclosure, the candidate neighboring cell list includes one or more candidate neighboring cells, and the cell information of a candidate neighboring cell in the candidate neighboring cell list includes at least one of the following information associated with the candidate neighboring cell: at least one of a cell identification (ID) or a cell ID offset; number of CRS ports; multicast broadcast single frequency network (MBSFN) configuration information; carrier frequency; and channel bandwidth.

According to an embodiment of the present disclosure, the configuration information includes at least one of the following information: scheduling information of physical downlink shared channel (PDSCH) of neighboring cells; DMRS configuration information of a neighboring cell; an indication of the reference signal for interference cancellation; and an indication of neighboring cell interference.

Embodiments of the present disclosure provide a method performed by a base station in a wireless communication system, which includes: transmitting configuration information to a terminal for the terminal to perform interference cancellation based on the configuration information.

According to an embodiment of the present disclosure, the method further includes: receiving first information indicating an interference cancellation capability of the terminal from the terminal.

According to an embodiment of the present disclosure, in case that the terminal does not support CRS interference cancellation, the transmitting configuration information to a terminal includes transmitting the following to the terminal: neighboring cell's CRS related information, wherein the neighboring cell's CRS related information includes information indicating a candidate neighboring cell list and cell information of candidate neighboring cells in the candidate neighboring cell list; and information for indicating neighboring cell(s) currently used for neighboring cell CRS rate matching in the candidate neighboring cell list.

According to an embodiment of the present disclosure, the configuration information includes at least one of the following information: neighboring cell's CRS related information, wherein the neighboring cell's CRS related information includes information indicating a candidate neighboring cell list and cell information of candidate neighboring cells in the candidate neighboring cell list; information for indicating neighboring cell(s) currently used for neighboring cell CRS rate matching in the candidate neighboring cell list; and information for indicating current neighboring cell(s) in the candidate neighboring cell list.

According to an embodiment of the present disclosure, in case that the terminal supports CRS interference cancellation and supports partially blind detection, the transmitting configuration information to a terminal includes transmitting the following to the terminal: neighboring cell's CRS related information, wherein the neighboring cell's CRS related information includes information indicating a candidate neighboring cell list and cell information of candidate neighboring cell(s) in the candidate neighboring cell list.

According to an embodiment of the present disclosure, in case that the terminal supports CRS interference cancellation and does not support blind detection, the transmitting configuration information to a terminal includes transmitting the following to the terminal: neighboring cell's CRS related information, wherein the neighboring cell's CRS related information includes information indicating a candidate neighboring cell list and cell information of candidate neighboring cells in the candidate neighboring cell list; and information for indicating current neighboring cell(s) in the candidate neighboring cell list.

According to an embodiment of the present disclosure, in case that the terminal supports interference cancellation based on DMRS and/or secondary reference signals and needs assistant information, the configuration information includes at least one of the following information: scheduling information of physical downlink shared channel (PDSCH) of neighboring cells; DMRS configuration information of neighboring cells; an indication of a reference signal for interference cancellation; and an indication of neighboring cell interference.

Embodiments of the present disclosure provide a method performed by a terminal in a wireless communication system, which includes: transmitting first information indicating an interference cancellation capability of the terminal to a base station; receiving configuration information from the base station, wherein the configuration information is associated with the interference cancellation capability of the terminal; and performing interference cancellation based on the configuration information.

Embodiments of the present disclosure provide a method performed by a base station in a wireless communication system, which includes: receiving first information indicating an interference cancellation capability of a terminal from the terminal; transmitting configuration information for the terminal to the terminal, wherein the configuration information is associated with the interference cancellation capability of the terminal, wherein the terminal performs interference cancellation based on the configuration information.

Embodiments of the present disclosure provide a terminal in a wireless communication system, which includes: a transceiver configured to transmit and receive signals; and a processor configured to perform methods performed by the terminal in the wireless communication system according to the embodiments of the present disclosure.

Embodiments of the present disclosure provide a base station in a wireless communication system, which includes: a transceiver configured to transmit and receive signals; and a processor configured to perform methods performed by the base station in the wireless communication system according to the embodiments of the present disclosure.

Embodiments of the present disclosure provide a computer-readable medium having stored thereon computer-readable instructions which, when executed by a processor, implement methods performed by a terminal in a wireless communication system according to the embodiments of the present disclosure or methods performed by a base station in the wireless communication system according to the embodiments of the present disclosure.

Exemplary embodiments of the present disclosure are further described below in conjunction with the accompanying drawings.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
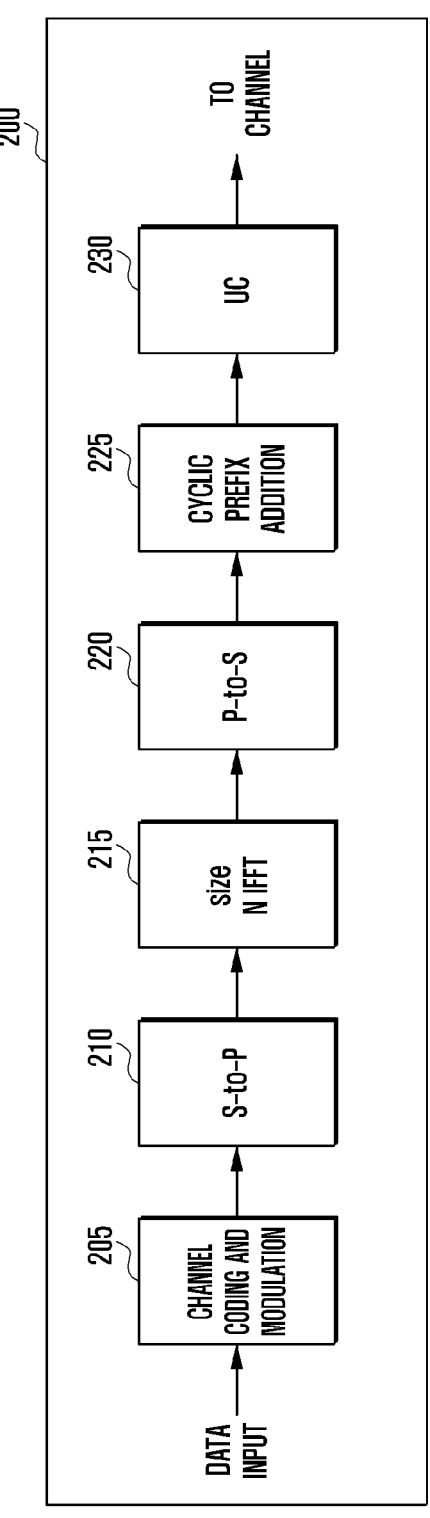
FIG. 2a illustrate example wireless transmission and reception paths according to the present disclosure.
Figure 2B:
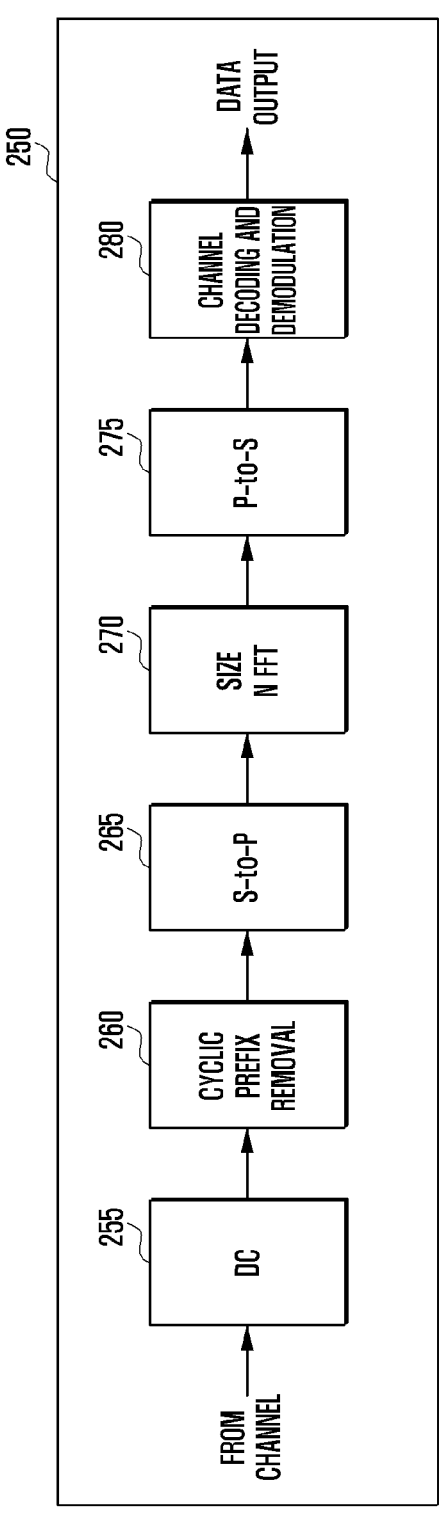
FIG. 2b illustrate example wireless transmission and reception paths according to the present disclosure.

FIGS. 2a and 2b illustrate example wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The upconverter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2a and 2b can be implemented using only hardware, or using a combination of hardware and software/firmware. As a specific example, at least some of the components in FIGS. 2a and 2b may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b can be combined, further subdivided or omitted, and additional components can be added according to specific requirements. Furthermore, FIGS. 2a and 2b are intended to illustrate examples of types of transmission and reception paths that can be used in a wireless network. Any other suitable architecture can be used to support wireless communication in a wireless network.

Figure 3A:
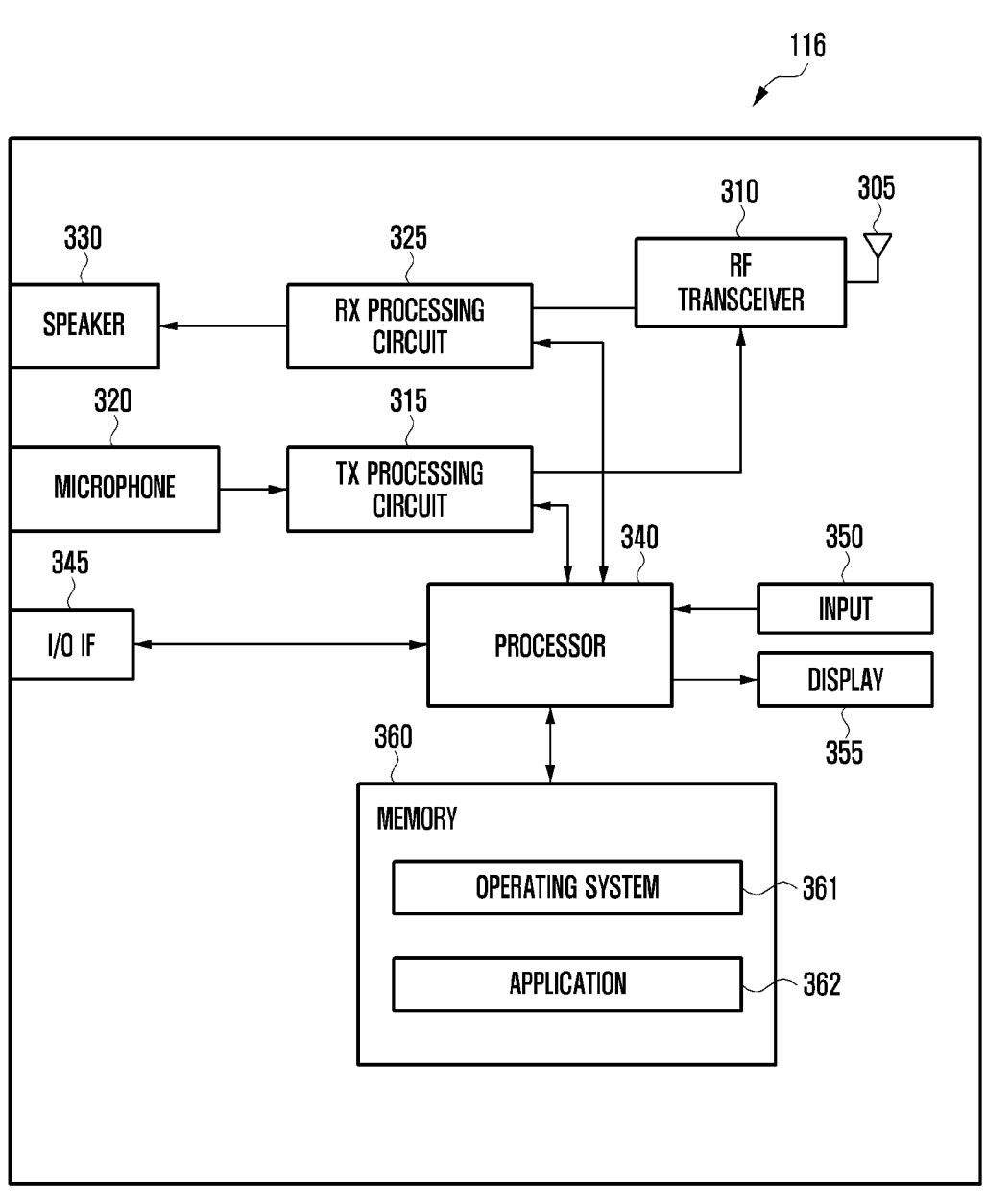
FIG. 3a illustrates an example UE according to the present disclosure.

FIG. 3a illustrates an example UE 116 according to the present disclosure. The embodiment of UE 116 shown in FIG. 3a is for illustration only, and UEs 111-115 of FIG. 1 can have the same or similar configuration. However, a UE has various configurations, and FIG. 3a does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to perform the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a illustrates an example of UE 116, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 116 is configured as a mobile phone or a smart phone, UEs can be configured to operate as other types of mobile or fixed devices.

Figure 3B:
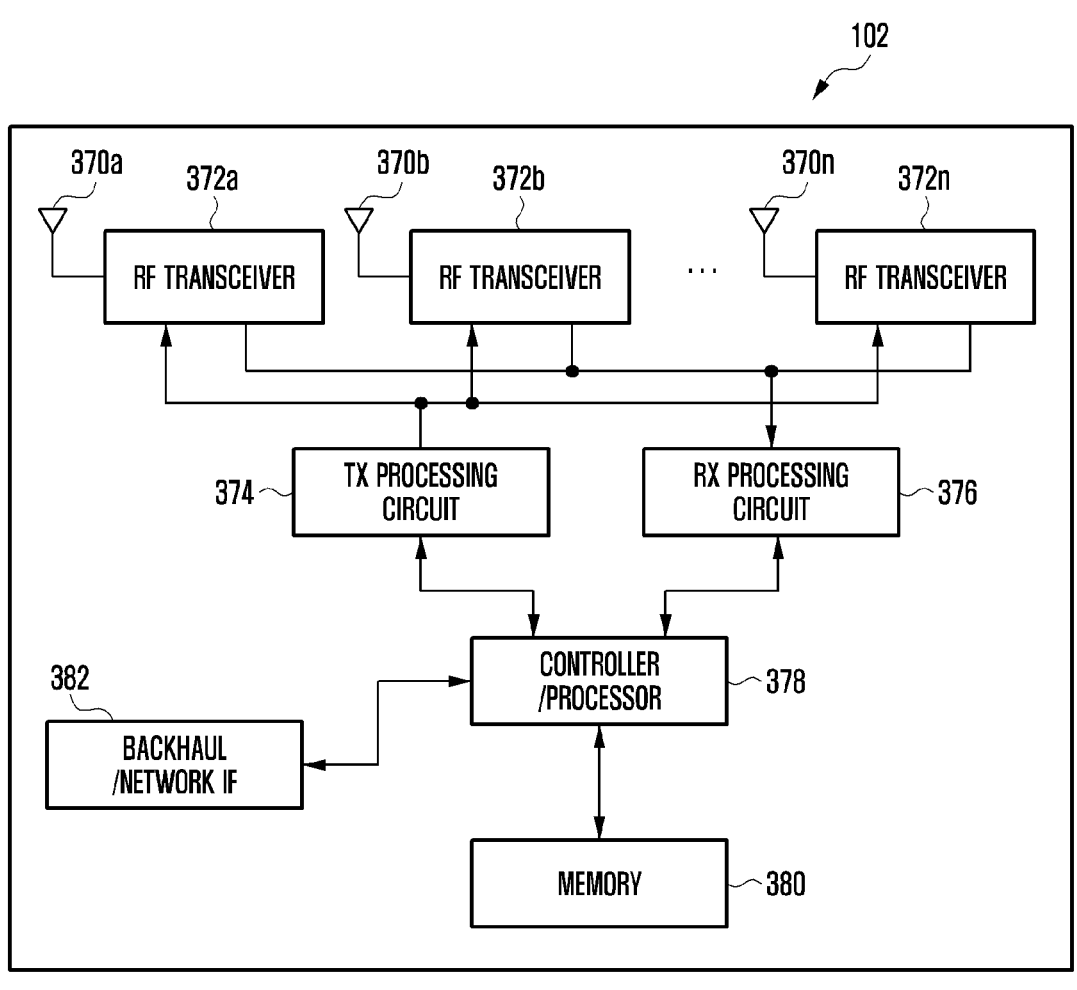
FIG. 3b illustrates an example gNB according to the present disclosure.

FIG. 3b illustrates an example gNB 102 according to the present disclosure. The embodiment of gNB 102 shown in FIG. 3b is for illustration only, and other gNBs of FIG. 1 can have the same or similar configuration. However, a gNB has various configurations, and FIG. 3b does not limit the scope of the present disclosure to any specific implementation of a gNB. It should be noted that gNB 101 and gNB 103 can include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to perform the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

In LTE and NR wireless communication systems, in order to make effective usage of limited spectrum resources, neighboring cells may be deployed in an intra-frequency manner. This method can save frequency resources, meanwhile also may bring intra-frequency interference issue. The intra-frequency interference may come from different communication systems, such as a LTE system or a NR system. Intra-frequency interference of neighboring cells includes Cell-specific Reference Signal (CRS) or other types of interference signals (e.g., non-CRS signals).

For example, a LTE system and a NR system may share the same frequency spectrum, while the LTE system needs to continuously transmit CRS information. Then CRS signals may interfere with the normal operation of the NR system. At present, for a case that CRS in a terminal's current serving cell conflicts with the NR system, it may be considered to configure assistant information (system assistant information) by the network side, and inform terminals of the NR system to perform rate matching on CRS locations of the serving cell to avoid interference; and for a case that PBCH of the NR system conflicts with the CRS, it may be considered to configure the Physical Broadcast Channel (PBCH) on Multicast Broadcast Single Frequency Network (MBSFN) sub-frames for the LTE system, or configure Type B SSB (Synchronization Signal Block) with a 30 kHz SCS for the NR system, to avoid interference.

However, the above schemes only deal with CRS interference of the LTE system within the serving cell of the terminal, and there is no special treatment for CRS interference of a neighboring cell, which leads to that when an intra-frequency LTE system is deployed, for users at the edge of the cell, CRS signals of the neighboring cell may interfere with signals of a target user and affect the performance of the target user's receiver.

In addition, for intra-frequency multi-cell deployment, there may be interference from other signals of the neighboring cell other than CRS. In the LTE system, a Minimum Mean Squared Error Interference Rejection Combining (MMSE-IRC) receiver is defined to deal with non-CRS interference of the neighboring cell.

In the LTE system, Demodulation Reference Signal (DMRS) may be used to estimate an interference covariance matrix at a Resource Block Group (RBG) level to solve the intra-cell or inter-cell interference of the LTE system. In the LTE system, the granularity of interference covariance matrix estimation in time domain is per sub-frame, which means, it may be considered that the interference covariance matrix is constant within a sub-frame range, and interference on DMRS is consistent with interference on a data channel (e.g., Physical Downlink Shared Channel (PDSCH) and Physical Downlink Control Channel (PDCCH)). But for the NR system, configuration of DMRS is more diverse and flexible. At the same time, the NR system supports different scheduling modes of PDSCH, which may be slot based transmission or non-slot based transmission. This brings many problems to the estimation of the interference covariance matrix. For example, interference within a slot may not be constant but changeable in the time domain, or the interference on a data channel (e.g., PDSCH, PDCCH) is inconsistent with the interference condition of DMRS resources, etc., all of which may have a great influence on interference estimation, thus reducing reliability of the system.

According to existing resources of NR and characteristics of NR, the present disclosure proposes a method for cancelling/mitigating intra-frequency interference signals, and gives specific example implementations.

The present disclosure provides methods of how to cancel/mitigate/reject the influence of interference on a receiver in a NR system when intra-frequency interference is present, and a terminal and a base station that perform corresponding methods. A performed communication method may include: a terminal firstly reports an interference processing capability of the terminal's receiver to a base station; the base station performs network configuration according to the reported capability of the terminal and correspondingly indicates system assistant information; and the terminal performs corresponding receiver processing according to the information provided by the system.

More specifically, the present disclosure proposes:

when intra-frequency interference is present, designing a new signaling interaction process between the terminal (e.g., UE) and the base station, and performing cooperative and effective interference cancellation between the base station and the terminal according to different interference types;

adding a terminal's reporting of an interference cancellation capability to assist the base station in proper scheduling;

providing system assistant information by the base station to assist the terminal in effective interference cancellation according to the terminal's reporting of the interference cancellation capability.

According to the interference cancellation methods provided by the present disclosure, the terminal may cancel different types of interference, including CRS interference of a LTE system and other interference of LTE and NR systems, such as interference in PDSCH and PDCCH, thereby improving the processing performance of the receiver.

Technical solutions of embodiments of the present disclosure may be applied to various communication systems, such as global system for mobile communication (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD), universal mobile telecommunications system (UMTS), worldwide interoperability for microwave access (WiMAX) communication system, 5th generation (5G) system or new radio (NR), etc. In addition, technical solutions of embodiments of the present disclosure may also be applied to any future-oriented communication technology or communication system.

Hereinafter, embodiments of the present invention will be described in detail, examples of which are shown in the accompanying drawings, in which the same or similar reference numerals indicate the same or similar elements or elements with the same or similar functions throughout. Embodiments described below with reference to the accompanying drawings are exemplary, only for explaining the present invention, and should not be interpreted as a limitation of the present invention.

First of all, according to an embodiment of the present invention, for a NR system with intra-frequency interference, interference cancellation capability of a terminal may be classified in advance, and the interference cancellation capability of the terminal may be classified with respect to different interference types (e.g., CRS interference of a LTE system or non-CRS interference of a LTE/NR system, etc.).

For example, in some implementations, the interference cancellation capability of the terminal may include at least one of an interference cancellation capability for CRS interference and an interference cancellation capability for non-CRS interference.

In some implementations, the interference cancellation capability for cell-specific reference signal (CRS) interference may comprise at least one of the following: whether the terminal supports CRS interference cancellation; whether the terminal supports blind detection or partially blind detection; and whether the terminal supports interference cancellation in case that interference at different frequency resource locations comes from different cells.

For example, in some implementations, for the case that LTE CRS intra-frequency interference is present (e.g., for CRS interference), the interference cancellation capability of the terminal may be classified into the following types:

Type 1: UE supports CRS interference cancellation and supports blind detection, and does not need any assistant information provided by the system (or base station or network side).

Type 2: UE supports CRS interference cancellation and supports partially blind detection, and needs the system to provide partial assistant information.

Type 3: UE supports CRS interference cancellation and needs to know all interference information in advance (e.g., the UE does not support blind detection, and needs the system to provide assistant information).

Type 4: UE does not support CRS interference cancellation.

Herein, blind detection means that the terminal may detect time-frequency resources on a received signal one by one without obtaining any assistant information (and/or indication information) to detect whether a CRS interference signal is present. While partially blind detection means that the terminal may need to use assistant information configured by a higher layer to detect the CRS interference signal, where the assistant information may simply indicate whether CRS interference is present, but not indicate specific CRS interference information, such as information of specific CRS resource locations, etc. Thus, in a case of partially blind detection, if the assistant information indicates that CRS interference is present, the terminal may perform blind detection on the received signal to detect CRS interference, and if the assistant information does not indicate that CRS interference is present, the terminal may not detect CRS interference.

For a terminal that supports CRS interference cancellation, the interference cancellation capability of the terminal may also comprise: whether the terminal supports interference cancellation in case that interference at different frequency resource locations comes from different cells. For example, for a terminal that supports CRS interference cancellation, the interference cancellation capability of the terminal may also comprise the following two types:

Type 1: the terminal supports CRS interference cancellation, and does not support that interference at different frequency locations comes from different cells.

Type 2: the terminal supports CRS interference cancellation, and also supports that interference at different frequency locations comes from different cells.

The above two types define whether the terminal is able to cancel/mitigate CRS interference signals from different interfering cells and with different frequency resource locations. For example, in case that the terminal supports that interference at different frequency locations comes from different cells, the base station may provide the terminal with assistant information about a set of different interfering cells, such as the cell identification (ID) and resource location information of each cell, etc., to assist the terminal in interference cancellation. After receiving the corresponding assistant information, the terminal may discriminate CRS interference from different interfering cells at multiple frequency locations one by one, so as to cancel them one by one.

In some implementations, the interference cancellation capability for non-CRS interference may comprise at least one of the following: the terminal supports interference cancellation based on a demodulation reference signal (DMRS); the terminal supports interference cancellation based on DMRS and/or secondary reference signals; and whether the terminal needs assistant information.

For example, in some implementations, in case that the terminal supports MMSE-IRC, for the non-CRS interference (such as interference of non-CRS signals from LTE or NR systems), the interference cancellation capability of the terminal may be classified into the following types:

Type 1: only support interference cancellation based on DMRS. For example, the terminal may only support interference covariance estimation at per slot level or symbol level and so on based on DMRS.

Type 2: support interference cancellation based on DMRS and/or secondary reference signals, and need the system (or base station or network side) to provide assistant information. For example, the terminal may support interference covariance estimation at a slot level or symbol level and so on based on DMRS and/or secondary reference signals, and need the system to provide assistant information.

Type 3: support interference cancellation based on DMRS and/or secondary reference signals, and do not need the system (or base station or network side) to provide assistant information. For example, the terminal may support interference covariance estimation at per slot level or symbol level and so on based on DMRS and/or the secondary reference signals, and does not need the system to provide assistant information.

Herein, the secondary reference signal may be any other reference signal other than DMRS, such as PTRS, TRS, CSI-RS, ZP-CSI-RS, or a newly defined resource reference signal, etc.

In case that the terminal needs the system (or network or base station) to provide assistant information, the network may include information indicating which signal may be used for interference covariance estimation to the terminal in the assistant information, and the corresponding assistant information will be described in detail below.

Figure 4:
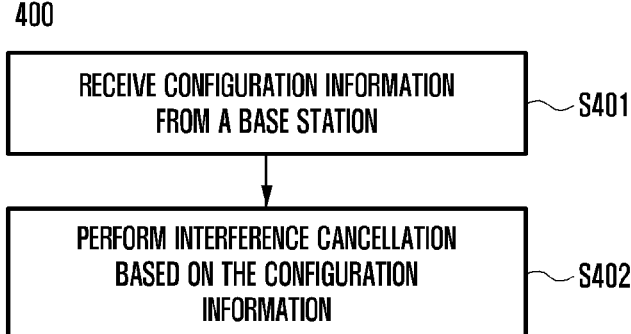
FIG. 4 illustrates a flowchart of a method performed by a terminal in a wireless communication system according to an embodiment of the present disclosure.

Next, FIG. 4 illustrates a flowchart of a method 400 performed by a terminal in a wireless communication system according to an embodiment of the present disclosure.

As shown in FIG. 4, in step S401, a terminal may receive configuration information for the terminal from a base station. And in step S402, the terminal may perform interference cancellation based on the received configuration information, where the configuration information may be associated with an interference cancellation capability of the terminal. For example, the base station may perform corresponding scheduling and configuration for the terminal according to the interference cancellation capability of the terminal, and/or further provide corresponding assistant information. In some implementations, the base station may know the interference cancellation capability of the terminal in advance, so that it is unnecessary for the terminal to report its interference cancellation capability. In some implementations, the terminal may transmit first information indicating the interference cancellation capability of the terminal to the base station, so that the base station may further provide configuration information (or assistant information for the terminal to perform interference cancellation) based on the interference cancellation capability reported by the terminal.

In some implementations, the configuration information received from the base station may include at least one of the following information: neighboring cell's CRS related information, wherein the neighboring cell's CRS related information includes information indicating a candidate neighboring cell list and cell information of candidate neighboring cell(s) in the candidate neighboring cell list; information for indicating neighboring cell(s) currently used for neighboring cell CRS rate matching in the candidate neighboring cell list; and information for indicating current neighboring cell(s) in the candidate neighboring cell list.

For example, in some implementations, in case that the terminal does not support CRS interference cancellation, receiving configuration information for the terminal from the base station may include receiving assistant information for the terminal to perform interference cancellation from the base station, in which the assistant information may include: neighboring cell's CRS related information, where the neighboring cell's CRS related information may include information indicating a candidate neighboring cell list and cell information of a candidate neighboring cell(s) in the candidate neighboring cell list; and information for indicating neighboring cell(s) currently used for neighboring cell CRS rate matching in the candidate neighboring cell list.

Specifically, the neighboring cell's CRS related information provided by the base station (or network) may be used by the terminal for rate matching, so as to avoid CRS interference. For example, the base station may indicate the candidate neighboring cell (e.g., LTE cells) list through for example Radio Resource Control (RRC) signaling, and the cell information of a candidate neighboring cell(s) in the candidate neighboring cell list may include at least one of the following information of the cell: cell ID or cell ID offset (Cell-ID/v-shift); number of CRS ports; MBSFN configuration information; carrier frequency; and channel bandwidth, etc.

In addition, the terminal may also receive an instruction for activating a subset of neighboring cells currently used for neighboring cell CRS rate matching in the candidate neighboring cell list from the base station through for example RRC/Downlink Control Information (DCI)/Medium Access Control (MAC) signaling. The indication may indicate the index(es) of the neighboring cell(s) currently used for neighboring cell CRS rate matching in the candidate neighboring cell list. In this case, in step S402, the terminal may perform rate matching for the indicated neighboring cells based on the above information, thereby cancelling CRS interference.

In some implementations, in case that the terminal supports CRS interference cancellation and supports partially blind detection (and/or needs the system to provide partial assistant information), receiving configuration information for the terminal from the base station may include receiving assistant information for the terminal to perform interference cancellation from the base station, in which the assistant information may include: neighboring cell's CRS related information, where the neighboring cell's CRS related information may include information indicating a candidate neighboring cell list and cell information of a candidate neighboring cell(s) in the candidate neighboring cell list.

Similarly, the base station may indicate the candidate neighboring cell list by RRC signaling, for example, and the cell information of a candidate neighboring cell(s) in the candidate neighboring cell list may include at least one of the following information of the cell: cell ID or cell ID offset (Cell-ID/v-shift); number of CRS ports; MBSFN configuration information; carrier frequency; and channel bandwidth, etc.

In this case, in step S402, based on the above information, the terminal may detect actual neighboring cells in the candidate neighboring cell list, and obtain current actual neighboring LTE cells, thereby cancelling CRS interference.

In some implementations, in case that the terminal supports CRS interference cancellation and does not support blind detection (and/or needs the system to provide assistant information), receiving configuration information for the terminal from the base station may include receiving assistant information for the terminal to perform interference cancellation from the base station, in which the assistant information may include: neighboring cell's CRS related information, where the neighboring cell's CRS related information may include information indicating a candidate neighboring cell list and cell information of a candidate neighboring cell(s) in the candidate neighboring cell list; and information for indicating neighboring cell(s) that are currently actually adjacent (e.g., activated) in the candidate neighboring cell list.

Similarly, the base station may indicate the candidate neighboring cell list by RRC signaling, for example, and the cell information of a candidate neighboring cell(s) in the candidate neighboring cell list may include at least one of the following information of the cell: cell ID or cell ID offset (Cell-ID/v-shift); number of CRS ports; MBSFN configuration information; carrier frequency; and channel bandwidth, etc.

In addition, the terminal may also receive information for indicating the current actual neighboring cell(s) in the candidate neighboring cell list from the base station through for example RRC/DCI/MAC signaling. For example, the information may include information indicating the index(es) of neighboring cell(s) that are currently actually adjacent (e.g., activated neighboring cells) in the candidate neighboring cell list. In this case, in step S402, the terminal may perform interference cancellation for CRS interference of neighboring cells that are currently actually adjacent (or activated neighboring cells) based on the above information.

In some implementations, in case that the terminal supports CRS interference cancellation and supports blind detection (and/or does not need the system to provide any assistant information), the configuration information received by the terminal from the base station may not include any assistant information for the terminal to perform interference cancellation. Because in this case, the terminal may perform interference cancellation by itself based on the blind detection and interference cancellation capability it supports.

In some implementations, for CRS interference, the terminal may perform CRS interference cancellation by the following methods.

For example, in case that the terminal does not support MMSE-IRC, the terminal may directly perform rate matching on CRS resource locations according to the assistant information provided by the base station as described above, without parsing the resources at the CRS resource locations, so as to avoid pollution or interference to useful information, and thus realize CRS interference cancellation.

For example, in case that the terminal supports MMSE-IRC, the terminal may perform interference cancellation based on MMSE-IRC. Specifically, MMSE-IRC is an MMSE-based interference rejection combining scheme. For example, a weight matrix of an MMSE-IRC receiver may be expressed as:

$$W_{RX,1}(k, l) = \hat{H}_1^H(k, l)R^{-1} \qquad \text{Equation (1)}$$

where, $\widehat{H}_{1,j}(k,l)$ represents the channel estimation on the j-th base station, the k-th subcarrier and the 1-th orthogonal frequency division multiplexing (OFDM) symbol, and for $H_j(k,l), j=\{1, \ldots, N_{BS}\}$, it represents a (NRx×NTx)-dimensional channel matrix of the terminal corresponding to the j-th base station; and R represents a covariance matrix, which may contain interference information.

If the terminal supports interference estimation based on DMRS, the covariance matrix is:

$$R = P_1 \, \hat{H}_1(k, l) \, \hat{H}_1^H(k, l) + \frac{1}{N_{sp}} \sum_{k,l \in DM-RS} \tilde{r}(k, l) \, \tilde{r}(k, l)^H \qquad \text{Equation (2)}$$

where, $$\tilde{r}(k,l)=r(k,l)-\widehat{H}_1(k,l)d_1(k,l) \qquad \text{Equation (3)}$$

where, P1 may be the transmission power of a serving cell for PDSCH and is the same as $E[|d_1(k,l)|^2]$; and d1(k,l) is a reference signal for interference measurement. In case of CRS interference cancellation, d1(k,l) may be a CRS interference signal transmitted by a neighboring cell. Here, the specific resource location of the CRS interference signal transmitted by the neighboring cell may be indicated by the assistant information transmitted by the base station as described above.

In the case of CRS interference, a covariance matrix R may be calculated according to Equation (2) and Equation (3), and then it may be brought into Equation (1) above to calculate the weight matrix of the MMSE-IRC receiver, so as to realize filtering or interference cancellation for the received signal. Subsequently, a next demodulation process may be performed based on the received signal after the filtering or interference cancellation.

Only two example schemes for CRS interference cancellation are shown above, and it should be understood that the present invention is not limited to this. In the case of CRS interference, CRS interference may also be cancelled based on any existing or future interference cancellation technology.

In some implementations, for the case that there is intra-frequency non-CRS interference and the terminal supports MMSE-IRC detection, when the terminal supports interference cancellation/mitigation/rejection (e.g., interference covariance estimation at a slot level or symbol level, etc.) based on DMRS and/or secondary reference signals and needs the system to provide assistant information, receiving configuration information for the terminal from the base station may include receiving assistant information for the terminal to perform interference cancellation, which may include at least one of the following information:

PDSCH scheduling information of a neighboring cell, for example, it may include a PDSCH scheduling mode (such as Type A or Type B), a PDSCH scheduling start location and a symbol length of the neighboring cell, etc.;

DMRS configuration information of the neighboring cell, for example, it may include DMRS configuration mode (such as Type 1 or Type 2), DMRS CDM group and a DMRS value, etc.;

an indication of a reference signal (e.g., a secondary reference signal) for interference cancellation (e.g., for interference measurement or interference covariance estimation), for example, the reference signal may be an existing reference signal such as Phase Tracking Reference Signal (PTRS), Tracking Reference Signal (TRS), Channel State Information-Reference Signal (CSI-RS) and Zero-Power Channel State Information-Reference Signal (ZP-CSI-RS), or may be a newly defined resource reference signal, such as interference measurement resource (IMR); and an indication of neighboring cell interference, for example, it may include information indicating whether interference at DMRS resource location is the same as interference at other locations, information indicating whether interference in different symbols or in different time domains is different, and so on.

In step S402, the terminal may estimate the interference covariance of the receiver based on one or more of the above information, so as to perform interference cancellation (e.g., interference cancellation for non-CRS interference).

For example, the terminal may perform non-CRS interference cancellation based on MMSE-IRC as described above. For example, a covariance matrix R may be calculated according to Equation (2) and Equation (3) as described above, and then it may be brought into Equation (1) above to calculate the weight matrix of the MMSE-IRC receiver, so as to realize filtering or interference cancellation for the received signal. Subsequently, a next demodulation process may be performed based on the received signal after the filtering or interference cancellation. Here, d1(k,l) in Equation (3) may be a non-CRS reference signal transmitted by a neighboring cell, which may be indicated by assistant information (e.g., information for indicating the reference signal for interference measurement or interference estimation) provided by the base station.

Only an example scheme for non-CRS interference cancellation is shown above. It should be understood that the present invention is not limited to this. In the case of non-CRS interference, interference cancellation for non-CRS interference may also be performed based on any existing or future interference cancellation technology.

Next, FIG. 5 illustrates a flowchart of a method 500 performed by a base station in a wireless communication system according to an embodiment of the present disclosure.

As shown in FIG. 5, in step S501, a base station may transmit configuration information to a terminal, for the terminal to perform interference cancellation based on the configuration information. The configuration information may be associated with an interference cancellation capability of the terminal. Similar to the description above in connection with FIG. 4, the terminal may perform interference cancellation based on the configuration information. However, depending on the interference cancellation capability of the terminal, the configuration information provided by the base station may or may not include assistant information for the terminal to perform interference cancellation. In some implementations, the base station may know the interference cancellation capability of the terminal in advance, so that it is unnecessary for the terminal to report its interference cancellation capability. In some implementations, the base station may receive first information indicating the interference cancellation capability of the terminal from the terminal, so as to further provide configuration information (or assistant information) for the terminal to perform interference cancellation) based on the interference cancellation capability reported by the terminal.

Similar to the above description in connection with FIG. 4, in some implementations, the interference cancellation capability of the terminal may include at least one of an interference cancellation capability for CRS interference and an interference cancellation capability for non-CRS interference, and the interference cancellation capability of the terminal may be classified similarly to the above description, which will not be repeated here.

In some implementations, the configuration information transmitted by the base station to the terminal may include at least one of the following information: neighboring cell's CRS related information, wherein the neighboring cell's CRS related information includes information indicating a candidate neighboring cell list and cell information of a candidate neighboring cell(s) in the candidate neighboring cell list; information for indicating a neighboring cell currently used for neighboring cell CRS rate matching in the candidate neighboring cell list; and information for indicating a current neighboring cell in the candidate neighboring cell list.

In some implementations, in case that the terminal does not support CRS interference cancellation, transmitting configuration information for the terminal by the base station to the terminal may include transmitting assistant information for the terminal to perform interference cancellation to the terminal, which may include: neighboring cell's CRS related information, where the neighboring cell's CRS related information may include information indicating a candidate neighboring cell list and cell information of a candidate neighboring cell(s) in the candidate neighboring cell list; and information for indicating a neighboring cell currently used for neighboring cell CRS rate matching in the candidate neighboring cell list.

In some implementations, in case that the terminal supports CRS interference cancellation and supports partial blind detection (and/or needs the system to provide partial assistant information), transmitting configuration information for the terminal by the base station to the terminal may include transmitting assistant information for the terminal to perform interference cancellation to the terminal, which may include: neighboring cell's CRS related information, where the neighboring cell's CRS related information may include information indicating a candidate neighboring cell list and cell information of a candidate neighboring cell(s) in the candidate neighboring cell list.

In some implementations, in case that the terminal supports CRS interference cancellation and does not support blind detection (and/or needs the system to provide assistant information), transmitting configuration information for the terminal by the base station to the terminal may include transmitting assistant information for the terminal to perform interference cancellation to the terminal, which may include: neighboring cell's CRS related information, where the neighboring cell's CRS related information may include information indicating a candidate neighboring cell list and cell information of a candidate neighboring cell(s) in the candidate neighboring cell list; and information for indicating neighboring cell(s) that are currently actually adjacent in the candidate neighboring cell list.

In some implementations, for the case that there is intra-frequency non-CRS interference and the terminal supports MMSE-IRC detection, when the terminal supports interference cancellation (e.g., interference covariance estimation at a slot level or symbol level, etc.) based on DMRS and/or a secondary reference signal and needs the system to provide assistant information, transmitting configuration information for the terminal by the base station to the terminal may include transmitting assistant information for the terminal to perform interference cancellation to the terminal, which may include at least one of the following information:

PDSCH scheduling information of a neighboring cell, for example, it may include a PDSCH scheduling mode (such as Type A or Type B), a PDSCH scheduling start location and a symbol length of the neighboring cell, etc.;

DMRS configuration information of the neighboring cell, for example, it may include DMRS configuration mode (such as Type 1 or Type 2), DMRS CDM group and a DMRS value, etc.;

an indication of a reference signal (e.g., a secondary reference signal) used for interference measurement or interference estimation, for example, the reference signal may be an existing reference signal such as PTRS, TRS, CSI-RS, ZP-CSI-RS, or may be a newly defined resource reference signal, such as interference measurement resource (IMR); and an indication of neighboring cell interference, for example, it may include information indicating whether interference at DMRS resource location is the same as interference at other locations, information indicating whether interference in different symbols or in different time domains is different, and so on.

Similarly, after receiving various configuration information from the base station (e.g., excluding or including assistant information for interference cancellation), the terminal may cancel the existing CRS interference or non-CRS interference by any existing or future interference cancellation method based on the received configuration information.

Figure 6:
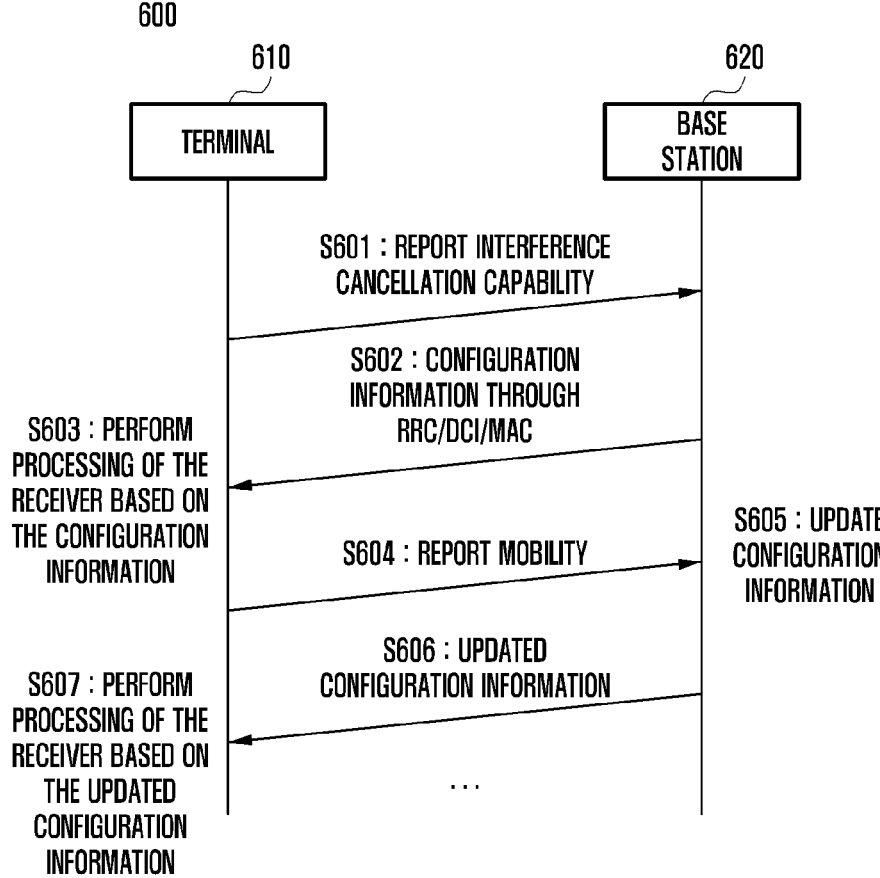
FIG. 6 illustrates an example signaling flow chart of a terminal and a base station according to an embodiment of the present disclosure.

FIG. 6 illustrates an example signaling flow chart 600 of a terminal and a base station according to an embodiment of the present disclosure.

As shown in FIG. 6, in step S601, the terminal 610 may report first information indicating its interference cancellation capability to the base station 620. In step S602, the base station 620 may transmit configuration information to the terminal 610 according to the first information reported by the terminal, for example, it may be configured by RRC/DCI/MAC. As described above, depending on the interference cancellation capability reported by the terminal, the configuration information may or may not include assistant information for the terminal to perform interference cancellation. In step S603, the terminal 610 may perform interference cancellation processing of the receiver based on the configuration information provided by the base station 620. Specifically, in case that the terminal does not need any assistant information (for example, the first information indicates that the terminal supports CRS interference cancellation and supports blind detection), the terminal 610 may perform interference cancellation by itself. In case that the first information of the terminal indicates that the terminal needs the base station to provide the assistant information for interference cancellation, the terminal 610 may perform interference cancellation based on the corresponding assistant information included in the configuration information. Then, in step S604, the terminal 610 may report its mobility to the base station 620, for example, report measurement information such as Reference Signal Receiving Power (RSRP)/Received Signal Strength Indicator (RSSI) of a serving cell, or measurement information such as RSRP/

RSSI of a neighboring cell, so that the base station can judge the current interfering situation of the terminal and provide necessary measurement results for updating the configuration information in the next step. In step S605, the base station 620 may update the configuration information according to the measurement information or the latest status reported by the terminal 610, and may provide the updated configuration information to the terminal 610 in step S606, for example, through RRC/DCI/MAC signaling. Similarly, the updated configuration information may or may not include assistant information for the terminal to perform interference cancellation. In step S607, the terminal 610 may perform new interference cancellation processing based on the updated configuration information. The terminal may continuously report its mobility or current measurement information to the base station, and obtain updated configuration information from the base station for interference cancellation.

Figure 7:
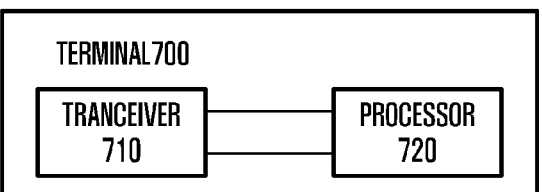
FIG. 7 illustrates a schematic diagram of a terminal according to an embodiment of the present disclosure.

Next, FIG. 7 illustrates a schematic diagram of a terminal 700 according to an embodiment of the present disclosure.

As shown in FIG. 7, the terminal 700 according to an embodiment of the present disclosure may include a transceiver 710 and a processor 720. The transceiver 710 may be configured to transmit and receive signals. The processor 720 may be configured to (e.g., control the transceiver 710 to) perform methods performed by the terminal according to the embodiments of the present disclosure.

Figure 8:
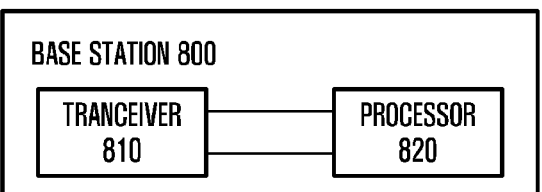
FIG. 8 illustrates a schematic diagram of a base station according to an embodiment of the present disclosure.

FIG. 8 illustrates a schematic diagram of a base station 800 according to an embodiment of the present disclosure.

As shown in FIG. 8, a base station 800 according to an embodiment of the present disclosure may include a transceiver 810 and a processor 820. The transceiver 810 may be configured to transmit and receive signals. The processor 820 may be configured to (e.g., control the transceiver 810 to) perform methods performed by the base station according to the embodiments of the present disclosure.

Embodiments of the present disclosure further provide a computer-readable medium having stored thereon computer-readable instructions, which, when executed by a processor, may implement the methods according to embodiments of the present disclosure.

Various embodiments of the present disclosure may be implemented as computer readable codes embodied on a computer readable recording medium from a specific perspective. The computer readable recording medium is any data storage device that may store data readable by a computer system. An example of the computer readable recording medium may include a read-only memory (ROM), a random access memory (RAM), a compact disk read-only memory (CD-ROM), a magnetic tape, a floppy disk, an optical data storage device, a carrier wave (e.g., data transmission via an Internet), and the like. Computer readable recording media may be distributed by computer systems connected via a network, and thus the computer readable codes may be stored and executed in a distributed manner. Furthermore, functional programs, codes, and code segments for implementing various embodiments of the present disclosure may be easily explained by those skilled in the art to which the embodiments of the present disclosure are applied.

It will be understood that the embodiments of the present disclosure may be implemented in a form of hardware, software, or a combination of hardware and software. Software may be stored as program instructions or computer readable codes executable on a processor on a non-transitory computer readable medium. An example of the non-transitory computer readable recording medium includes a magnetic storage medium (e.g., a ROM, a floppy disk, a hard disk, etc.) and an optical recording medium (e.g., a CD-ROM, a digital video disk (DVD), etc.). Non-transitory computer readable recording media may also be distributed on computer systems coupled by a network, so that the computer readable codes are stored and executed in a distributed manner. The medium can be read by a computer, stored in a memory, and executed by a processor. Various embodiments may be implemented by a computer or a portable terminal including a controller and a memory, and the memory may be an example of a non-transitory computer readable recording medium suitable for storing program(s) having instructions to implement the embodiments of the present disclosure. The disclosure may be realized by a program having codes for specifically implementing the apparatus and method described in the claims, which is stored in a machine (or computer) readable storage medium. The program may be electronically carried on any medium, such as a communication signal transferred via a wired or wireless connection, and the present disclosure suitably includes equivalents thereof.

The above descriptions are only specific implementations of the present disclosure, but a protection scope of the present disclosure is not limited to this. Any technician familiar with the technical field may make various changes or substitutions within a technical scope revealed in the present disclosure, and these changes or substitutions should be covered within the protection scope of the present disclosure. Therefore, the protection scope of the present disclosure should be subject to a protection scope of the claims.

The invention claimed is:

1. A method performed by a user equipment (UE) in a wireless communication system, the method comprising:

transmitting, to a base station, UE capability information for supporting a cell reference signal-interference mitigation (CRS-IM) associated with an assistance of a network signaling, wherein the UE capability information includes at least one of first information indicating that the UE supports a neighboring long term evolution (LTE) cell CRS-IM with the assistance of the network signaling or second information indicating that the UE supports the neighboring LTE cell CRS-IM without the assistance of the network signaling;

receiving, from the base station, at least one configuration information on a LTE neighbor cell associated with a CRS; and performing the CRS-IM based on the at least one configuration information on the LTE neighbor cell associated with the CRS, wherein in case that the UE capability information includes the first information indicating that the UE supports a neighboring LTE cell CRS-IM with the assistance of the network signaling, the at least one configuration information on the LTE neighbor cell associated with the CRS includes information on a channel bandwidth.

2. The method of claim 1, wherein the at least one configuration information on the LTE neighbor cell associated with the CRS further includes at least one of information on a downlink center frequency, information on a physical cell identifier (ID), information on a multicast broadcast single frequency network (MBSFN) subframe configuration, information on a CRS antenna ports number, or information on a shifting value.

3. The method of claim 1, wherein the at least one configuration information on the LTE neighbor cell is associated with an overlapping spectrum for an LTE and a new radio (NR).

4. A method performed by a base station in a wireless communication system, the method comprising:

receiving, from a user equipment (UE), UE capability information for supporting a cell reference signal-interference mitigation (CRS-IM) associated with an assistance of a network signaling, wherein the UE capability information includes at least one of first information indicating that the UE supports a neighboring long term evolution (LTE) cell CRS-IM with the assistance of the network signaling or second information indicating that the UE supports the neighboring LTE cell CRS-IM without the assistance of the network signaling;

generating at least one configuration information on a LTE neighbor cell associated with a CRS; and transmitting, to the UE, the at least one configuration information on the LTE neighbor cell associated with the CRS, wherein the CRS-IM is performed based on the at least one configuration information on the LTE neighbor cell associated with the CRS, and wherein in case that the UE capability information includes the first information indicating that the UE supports a neighboring LTE cell CRS-IM with the assistance of the network signaling, the at least one configuration information on the LTE neighbor cell associated with the CRS includes information on a channel bandwidth.

5. The method of claim 4, wherein the at least one configuration information on the LTE neighbor cell associated with the CRS further includes at least one of information on a downlink center frequency, information on a physical cell identifier (ID), information on a multicast broadcast single frequency network (MBSFN) subframe configuration, information on a CRS antenna ports number, or information on a shifting value, and wherein the at least one configuration information on the LTE neighbor cell is associated with an overlapping spectrum for an LTE and a new radio (NR).

6. A user equipment (UE) in a wireless communication system, the UE comprising:

a transceiver; and a controller coupled with the transceiver, and configured to:

transmit, to a base station, UE capability information for supporting a cell reference signal-interference mitigation (CRS-IM) associated with an assistance of a network signaling, wherein the UE capability information includes at least one of first information indicating that the UE supports a neighboring long term evolution (LTE) cell CRS-IM with the assistance of the network signaling or second information indicating that the UE supports the neighboring LTE cell CRS-IM without the assistance of the network signaling, receive, from the base station, at least one configuration information on a LTE neighbor cell associated with a CRS, and perform the CRS-IM based on the at least one configuration information on the LTE neighbor cell associated with the CRS, wherein in case that the UE capability information includes the first information indicating that the UE supports a neighboring LTE cell CRS-IM with the assistance of the network signaling, the at least one configuration information on the LTE neighbor cell associated with the CRS includes information on a channel bandwidth.

7. The UE of claim 6, wherein the at least one configuration information on the LTE neighbor cell associated with the CRS further includes at least one of information on a downlink center frequency, information on a physical cell identifier (ID), information on a multicast broadcast single frequency network (MBSFN) subframe configuration, information on a CRS antenna ports number, or sixth information on a shifting value, and wherein the at least one configuration information on the LTE neighbor cell is associated with an overlapping spectrum for an LTE and a new radio (NR).

8. A base station in a wireless communication system, the base station comprising:

a transceiver; and a controller coupled with the transceiver, and configured to:

receive, from a user equipment (UE) UE capability information for supporting a cell reference signal-interference mitigation (CRS-IM) associated with an assistance of a network signaling, wherein the UE capability information includes at least one of first information indicating that the UE supports a neighboring long term evolution (LTE) cell CRS-IM with the assistance of the network signaling or second information indicating that the UE supports the neighboring LTE cell CRS-IM without the assistance of the network signaling, generate at least one configuration information on a LTE neighbor cell associated with a CRS, and transmit, to the UE, the at least one configuration information on the LTE neighbor cell associated with the CRS, wherein the CRS-IM is performed based on the at least one configuration information on the LTE neighbor cell associated with the CRS, and wherein in case that the UE capability information includes the first information indicating that the UE supports a neighboring LTE cell CRS-IM with the assistance of the network signaling, the at least one configuration information on the LTE neighbor cell associated with the CRS includes information on a channel bandwidth.

9. The base station of claim 8, wherein the at least one configuration information on the LTE neighbor cell associated with the CRS further includes at least one of information on a downlink center frequency, information on a physical cell identifier (ID), information on a multicast broadcast single frequency network (MBSFN) subframe configuration, information on a CRS antenna ports number, or information on a shifting value, and wherein the at least one configuration information on the LTE neighbor cell is associated with an overlapping spectrum for an LTE and a new radio (NR).

10. The method of claim 1, wherein the information on the channel bandwidth needs to be included in the at least one configuration information on the LTE neighbor cell associated with the CRS, in case that the UE supports a capability of the first information.

11. The method of claim 4, wherein the information on the channel bandwidth needs to be included in the at least one configuration information on the LTE neighbor cell associated with the CRS, in case that the UE supports a capability of the first information.

12. The UE of claim 6, wherein the information on the channel bandwidth needs to be included in the at least one configuration information on the LTE neighbor cell associated with the CRS, in case that the UE supports a capability of the first information.

13. The base station of claim 8, wherein the information on the channel bandwidth needs to be included in the at least one configuration information on the LTE neighbor cell associated with the CRS, in case that the UE supports a capability of the first information.

\* \* \* \* \*